(12) United States Patent
Doherty (10) Patent No.: US 11,413,998 B2
(45) Date of Patent: Aug. 16, 2022

(54) DRINKING RECEPTACLE HOLDER (71) Applicant: Safran Seats GB Limited, Cwmbran (GB)

(72) Inventor: Ciaran Doherty, Cardiff (GB)

(73) Assignee: Safran Seats GB Limited, Cwmbran (GB)

(*) Notice: Subject to any disclaimer, the term of this patent is extended or adjusted under 35 U.S.C. 154(b) by 145 days.

(21) Appl. No.: 16/704,139

(22) Filed: Dec. 5, 2019

(65) Prior Publication Data
US 2020/0180489 A1    Jun. 11, 2020

(30) Foreign Application Priority Data

Dec. 5, 2018 (GB) ...................................... 1819866

(51) Int. Cl.
*B60N 3/10* (2006.01)
*B64D 11/06* (2006.01)
*A47G 23/02* (2006.01)

(52) U.S. Cl.
CPC ......... *B60N 3/105* (2013.01); *A47G 23/0216* (2013.01); *A47G 23/0241* (2013.01); *B60N 3/102* (2013.01); *B64D 11/0638* (2014.12); *B64D 11/0639* (2014.12)

(58) Field of Classification Search
CPC .... B60N 3/105; B60N 3/102; B64D 11/0638; B64D 11/0639; A47G 23/0216; A47G 23/0241
See application file for complete search history.

(56) References Cited

U.S. PATENT DOCUMENTS

| | | | | |
|---|---|---|---|---|
| 5,054,733 A | * | 10/1991 | Shields | B60N 3/106 248/313 |
| 5,072,989 A | * | 12/1991 | Spykerman | B60N 2/793 297/188.16 |

(Continued)

FOREIGN PATENT DOCUMENTS

| | | |
|---|---|---|
| CN | 106235841 | 12/2016 |
| DE | 19937356 | 2/2001 |

(Continued)

OTHER PUBLICATIONS

Europe Patent Application No. 19213330.4, Extended European Search Report, dated Apr. 15, 2020.

(Continued)

*Primary Examiner* — Anita M King
(74) *Attorney, Agent, or Firm* — Kilpatrick Townsend & Stockton LLP (57) ABSTRACT

A drinking receptacle holder comprising a holding portion, the holding portion providing an aperture with a variable size, and a base portion, wherein the drinking receptacle holder is configured so that a drinking receptacle can be received within the aperture of the holding portion with the drinking receptacle resting upon the base portion, wherein the base portion is configured to be pushed away from the holding portion by the drinking receptacle as the drinking receptacle is moved through the aperture of the holding portion, and wherein the holding portion is connected to the base portion such that the size of the aperture is configured to reduce as the base portion is pushed away from the holding portion.

10 Claims, 7 Drawing Sheets

(56) References Cited

U.S. PATENT DOCUMENTS

| | | | | |
|---|---|---|---|---|
| 5,628,486 | A * | 5/1997 | Rossman | B60N 3/107 |
| | | | | 248/311.2 |
| 6,279,992 | B1 | 8/2001 | Plocher et al. | |
| 6,758,452 | B1 * | 7/2004 | Salenbauch | B60N 3/10 |
| | | | | 224/926 |
| 7,121,517 | B2 * | 10/2006 | Oana | B60N 3/102 |
| | | | | 248/311.2 |
| 2004/0016859 | A1 * | 1/2004 | Nishizawa | B60N 3/106 |
| | | | | 248/311.2 |
| 2005/0269919 | A1 * | 12/2005 | Sambommatsu | B60N 3/106 |
| | | | | 312/319.5 |
| 2006/0065802 | A1 * | 3/2006 | Harada | B60N 2/2887 |
| | | | | 248/311.2 |
| 2011/0127308 | A1 | 6/2011 | Ogura | |
| 2016/0304019 | A1 * | 10/2016 | Dargavell | B60N 3/106 |

FOREIGN PATENT DOCUMENTS

| | | |
|---|---|---|
| DE | 102008048212 | 3/2010 |
| DE | 102009053397 | 5/2011 |
| EP | 1878612 | 1/2008 |
| WO | 2011056373 | 5/2011 |

OTHER PUBLICATIONS

United Kingdom Patent Application No. 1819866.3, Examination Report, dated Feb. 10, 2022.

* cited by examiner

DRINKING RECEPTACLE HOLDER

CROSS REFERENCE TO RELATED APPLICATION

This application claims the benefit of and priority to United Kingdom Patent Application No. 1819866.3, filed on Dec. 5, 2018, the entire contents of which application are hereby incorporated herein by this reference.

FIELD OF THE INVENTION

The present invention concerns a drinking receptacle holder. More particularly, but not exclusively, this invention concerns an adjustable drinking receptacle holder.

BACKGROUND OF THE INVENTION

Drinking receptacle holders can be found in a variety of situations, usually adjacent to a seat that does not have ready access to a stable surface upon which to place a drinking receptacle. For example, adjacent to the drivers' seat of a car.

Typically a drinking receptacle holder will comprise a fixed diameter chosen to be representative of the size of a range of drinking receptacles, such as cups and/or drinking bottles. If a drinking receptacle is much narrower than the diameter of the aperture then the receptacle holder will not adequately hold the receptacle. For example, if the receptacle holder is located within a moving vehicle, a cup having a diameter that is significantly less than the diameter of the aperture may slide around or topple within the receptacle holder and spill the contents of the cup. Or if a drinking receptacle has a diameter that is larger than the diameter of the aperture then the drinking receptacle will not fit within the aperture. This is particularly inconvenient where the drinking receptacle holder is, for example, a cup and does not have a lid because the cup must be held by its user who must be careful not to spill the contents, or where the user is in a situation where it is inconvenient to manually hold a drinking receptacle for an extended period of time, for example when travelling on an aircraft.

The present invention seeks to address the above mentioned problems.

SUMMARY OF THE INVENTION

The present invention provides, according to a first aspect, a drinking receptacle holder comprising a holding portion, the holding portion providing an aperture with a variable size, and a base portion, wherein the drinking receptacle holder is configured so that a drinking receptacle can be received within the aperture of the holding portion with the drinking receptacle resting upon the base portion, wherein the base portion is configured to be pushed away from the holding portion by the drinking receptacle as the drinking receptacle is moved through the aperture of the holding portion, and wherein the holding portion is connected to the base portion such that the size of the aperture is configured to reduce as the base portion is pushed away from the holding portion.

Typically a drinking receptacle holder will comprise an aperture having a fixed size. This means that the size of the aperture has to be chosen to be representative of a range of drinking receptacles, such as cups and/or drinking bottles. If a drinking receptacle is much narrower than the size of the aperture then the receptacle holder will not adequately hold the receptacle. For example, if the receptacle holder is located within a moving vehicle, a cup having a size that is significantly less than the size of the aperture may slide around or topple within the receptacle holder and spill the contents of the cup. Or if a drinking receptacle has a size that is larger than the size of the aperture then the drinking receptacle will not fit within the aperture. This is particularly inconvenient where the drinking receptacle holder is, for example, a cup and does not have a lid because the cup must be held by its user. The present invention overcomes the above mentioned problems by providing a drinking receptacle holder that has an aperture that can be adjusted to suit different sizes of drinking receptacle. Furthermore, the drinking receptacle holder is configured so that adjustment of the size of the aperture happens as the base of the drinking receptacle holder is moved away from the holding portion. A user can therefore easily adjust the size of the aperture to suit the particular drinking receptacle by simply placing the drinking receptacle into the aperture so that the drinking receptacle rests on the base and then by moving the drinking receptacle through the aperture to push the base away from the holding portion until the desired size is achieved.

The aperture may be substantially circular. The aperture may have a diameter. The diameter of the aperture may be configured to reduce as the base portion is pushed away from the holding portion.

The base portion may be configured to be pushed away from the holding portion under the weight of a drinking receptacle. This represents an especially advantageous embodiment of the invention because reduction of the size of the aperture happens automatically or semi-automatically (i.e. with relatively little external force needing to be provided by the user) as the gravitational force acting on the drinking receptacle pushes the base portion away from the holding portion.

The drinking receptacle holder may be configured so that a drinking receptacle is moved along an axis into the holding portion. The drinking receptacle holder may be configured so that a drinking receptacle can be moved into the aperture on a first side of the holding portion. The base portion may be positioned on a second, opposite side of the holding portion. In use, the first side of the drinking receptacle may correspond to an upper side of the holding portion and the second side of the holding portion may correspond to a lower side of the holding portion. The base portion may be positioned below the aperture in use. The size of the aperture may be configured to reduce as the base portion moves away from the holding portion under the weight of the drinking receptacle.

The bottle holder may comprise a resilient biasing member that biases the base portion towards the holding portion. The base portion may therefore be configured to have to be pushed away from the holding portion against the resilient bias of the member. The member may be a torsion spring.

The base portion may have a first position in which the size of the aperture is a maximum. The base portion may have a second position in which the size of the aperture is a minimum. The first position may correspond to a position in which the base portion is adjacent the aperture of the holding portion. The first position may correspond to a position in which the base portion is directly beneath the aperture of the holding portion. The base portion may be biased towards the first position by the resilient bias of a resilient biasing member. In the second position, the base portion may be further away from the aperture of holding portion than when in the first position. The size of the aperture when the base portion is in the first position may be greater than the size of the aperture when the base portion is in the second position.

When the base portion is pushed away from the holding portion by a drinking receptacle, the size of the aperture may be configured to reduce until an inner edge of the aperture abuts against the drinking receptacle. The inner edge of the aperture may abut the drinking receptacle in at least two locations. When the aperture is substantially circular, the aperture may abut a drinking receptacle having a substantially circular profile at substantially all locations around the circumference of the drinking receptacle. The drinking receptacle holder may therefore be configured to securely grip a drinking receptacle within the aperture. This reduces the chances of the drinking receptacle moving around within the drinking receptacle holder and spilling its contents. The size of the aperture may be configured to reduce until it is substantially equal to the size of the drinking receptacle.

The bottle holding portion may comprise a channel and one or more members configured to move into the channel as the base moves away from the holding portion, wherein the members define the aperture. The members may be moveable into the channel to reduce the size of the aperture. The members may be moveable out of the channel to increase the size of the aperture. The members may be receptacle gripping members that are configured to move into the channel to abut and grip the drinking receptacle. The members may be circumferentially spaced around the channel to define the aperture. There may be two or more members. The members may be vanes that define the circumference of a substantially circular aperture. The vanes may have straight or curved edges. The shape of the aperture may be a polygon. The vanes may be moveable into the channel to reduce the size of the substantially circular aperture. Configuring the receptacle holder with vanes that form a substantially circular aperture that is arranged to abut a drinking receptacle ensures that drinking receptacles having circular profiles are uniformly and securely held.

The holding portion may comprise a cam plate defining the channel and wherein, as the base portion is pushed away from the holding portion by the drinking receptacle, the cam plate is configured to abut against the members in order to move the members into the channel, thereby reducing the size of the aperture. The cam plate may be annular. The channel may be defined by the hole in the annular cam plate. The members may comprise pins that are configured to sit within cam slots on the cam plate. The members may be configured to move into the channel as the pins abut against the cam slots.

The holding portion may comprise a further plate. The cam plate may be configured to abut against the members when the cam plate is rotated relative to the further plate. The further plate may be annular. The channel may be defined by the hole in the annular further plate. The members may be positioned between the cam plate and the further plate. The further plate may be a guide plate configured to ensure that the members move linearly into the channel. Each member may comprise a member guide configured to ensure that the member moves linearly into the channel to reduce the size of the aperture. The member guide may be configured to interact with a corresponding member guide located in the further plate. The further plate may be a guide plate. Each member guide may be a linear elongate projection that projects along a side of the member. Each member guide in the guide plate may be a linear elongate slot configured to receive the member guide of its corresponding member. The projecting member guides may be slidably movable within the slots. Alternatively, each member guide may be a linear elongate slot formed along a side of the member and each member guide in the guide plate may be a linear elongate projection configured to be received in the slot of its corresponding member.

The drinking receptacle holder may further comprise a body portion. The body portion may be a moveable body portion. The moveable body portion may be moveably mounted in relation to the holding portion. The cam plate may be configured to rotate relative to the further plate as the moveable body portion moves towards the holding portion. The moveable body portion may be configured to move towards the holding portion as the base portion is pushed away from the holding portion by a drinking receptacle. Movement of the base portion away from the holding portion by the drinking receptacle may therefore move the moveable body portion towards the holding portion, thereby causing the size of the aperture to reduce. Movement of the base portion away from the holding portion by the drinking receptacle may pull the moveable body portion towards the holding portion. As the base portion is moved away from the holding portion by a drinking receptacle, the base portion may move vertically away from the holding portion (i.e. in the direction of movement of the drinking receptacle). As the base portion is moved away from the holding portion by a drinking receptacle, the base portion may not substantially move horizontally with respect to the holding portion (i.e. the base portion may not substantially move in the direction perpendicular to the direction of movement of the drinking receptacle).

The holding portion may be moveably mounted in relation to the body portion. The cam plate may be configured to rotate relative to the further plate as the holding portion moves towards the body portion. The holding portion may be configured to move towards the body portion as the base portion is pushed away from the holding portion by a drinking receptacle. Movement of the base portion away from the holding portion by the drinking receptacle may therefore move the holding portion towards the body portion, thereby causing the size of the aperture to reduce.

The holding portion may be movably mounted in relation to the body portion via a first arm. The cam plate may be configured to rotate relative to the further plate via a rack and pinion arrangement. The first arm may comprise a multiplicity of teeth that form a rack on the first arm. The cam plate may comprise a multiplicity of teeth that form a pinion on the cam plate. The pinion may be formed on the outer circumference of the cam plate. The first plate may comprise a multiplicity of teeth that form a pinion on the first plate. The pinion may be formed on the outer circumference of the first plate.

The base portion may be fixed with respect to the holding portion so that the base portion can only move away from the holding portion along the axis of movement of the drinking receptacle as the drinking receptacle is moved into the holding portion.

As the base portion is pushed away from the holding portion by the drinking receptacle, the drinking receptacle may be moved into abutment with the holding portion. The base portion may be fixed with respect to the holding portion by the drinking receptacle abutting the holding portion. The moveable body portion may be pulled towards the holding portion as the base portion is pushed away from the holding portion. The holding portion may be pushed towards the body portion by the drinking receptacle as the base portion is pushed away from the holding portion. The drinking receptacle may be moved into abutment with an inner edge of the aperture as the base portion is pushed away from the holding portion. The drinking receptacle may be moved into abutment with a part of the inner edge of the aperture that is closest to the main body.

The base portion may be pivotally mounted to the body portion via an arm so that, as the base portion is pushed away from the holding portion by the drinking receptacle, the base portion moves away from the holding portion along a first axis and moves towards the body portion along a second, perpendicular axis. As the base portion moves, the base portion may follow the circumference of a circle having a radius equal to the length of the arm.

The drinking receptacle holder may comprise a housing. The holding portion may be fixed within the housing. The moveable body portion may be moveably mounted within the housing. The first arm and second arm may be slidably mounted within the housing. The first arm and second arm may be slidably mounted within channels in the housing. As the base portion is moved away from the holding portion the first arm and second arm may slide within the housing to move the moveable body portion closer to the holding portion. The housing may be configured for mounting to another structure, for example, and aircraft seat unit.

According to a second aspect, the present invention provides an aircraft seat unit comprising an aircraft seat and a drinking receptacle holder according to the first aspect of the invention. The drinking receptacle may be mounted to an arm rest of the aircraft seat. The drinking receptacle may be mounted to a forward wall of the seat unit. The forward wall of the seat unit may be formed by an adjacent seat unit or adjacent aircraft seat.

BRIEF DESCRIPTION OF THE DRAWINGS

An embodiment of the present invention will now be described by way of example only with reference to the accompanying schematic drawings of which.

DETAILED DESCRIPTION

Figure 1:
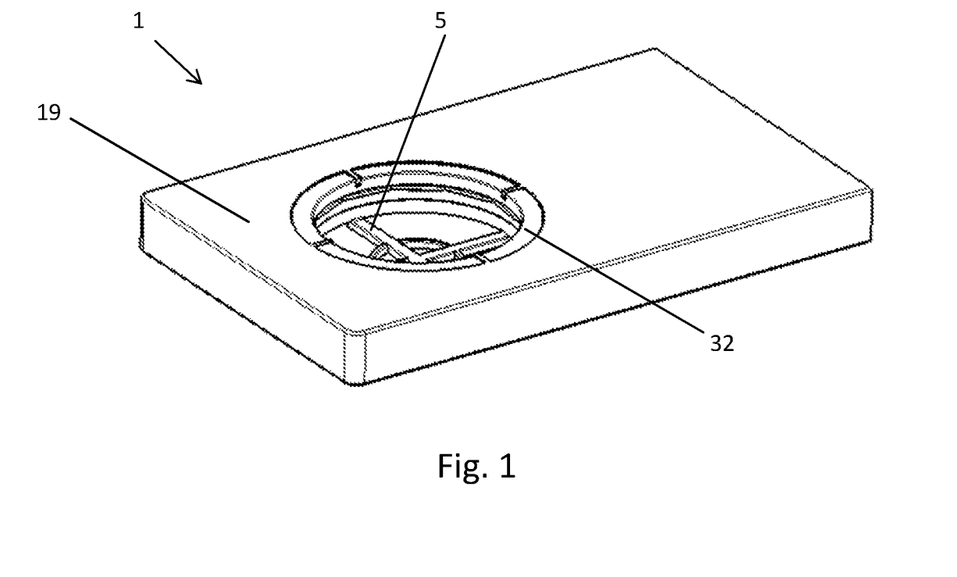
FIG. 1 is a perspective view of a drinking receptacle holder according to a first embodiment of the invention.
Figure 2:
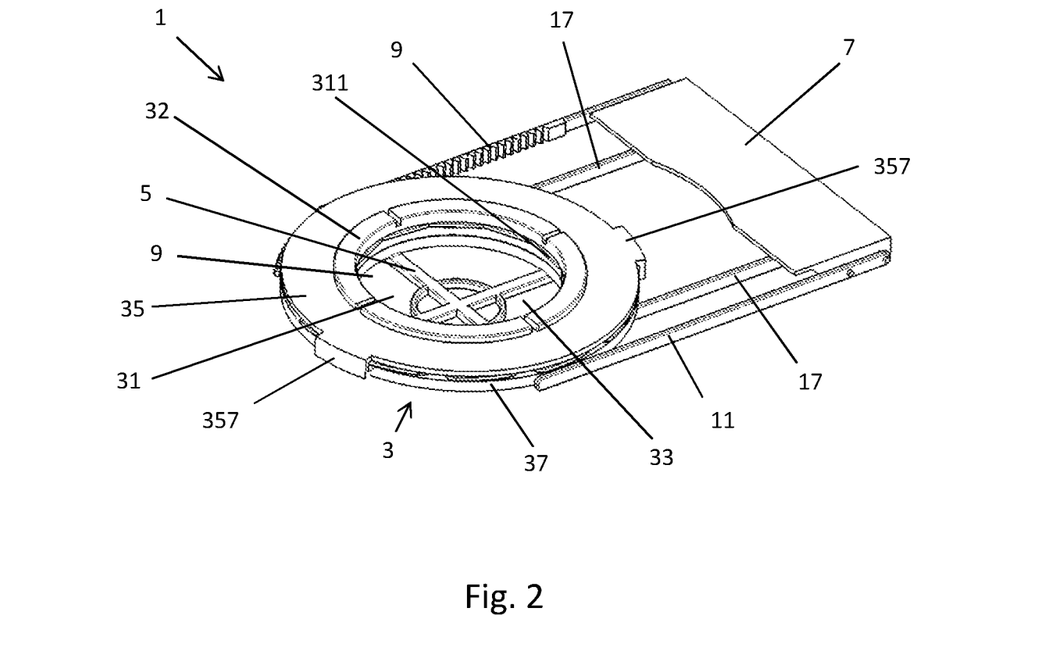
FIG. 2 is a perspective view of the drinking receptacle holder shown in FIG. 1, wherein the drinking receptacle holder is shown without its outer housing.

A drinking receptacle holder 1 according to an embodiment of the invention is shown in FIG. 1 with an outer housing 19 of the drinking receptacle holder 1 in place and FIG. 2 with the outer housing 19 removed to expose the internal components of the drinking receptacle holder 1. As can be seen from FIG. 2, within the housing 19 the holder 1 comprises a generally disc-shaped receptacle holding portion 3, a base portion 5, and a movable body 7. The holding portion 3 is connected to the movable body 7 via a rack arm 9 and a runner arm 11, and the base portion 5 is connected to the movable body 7 via a pair of rotating arms 17. In the configuration of the holder 1 shown in FIG. 1 and FIG. 2, wherein the holder 1 is not holding a drinking receptacle, the base portion 5 is positioned adjacent an aperture 31 defined by the holding portion 3, on a first side of the holding portion 3, the first side of the holding portion 3 corresponding to an underside of the holding portion 3 which faces downwardly in use. The holding portion 3 comprises a projecting circular lip 32 that encircles the aperture 31 at a second side of the holding portion, the second side of the holding portion 3 being located opposite the first side of the holding portion 3 and facing upwardly in use. In normal use, the holding portion 3 is mounted within the housing 19 such that the projecting circular lip 32 is received within a corresponding hole in the housing 19, as shown in FIG. 1.

Figure 3:
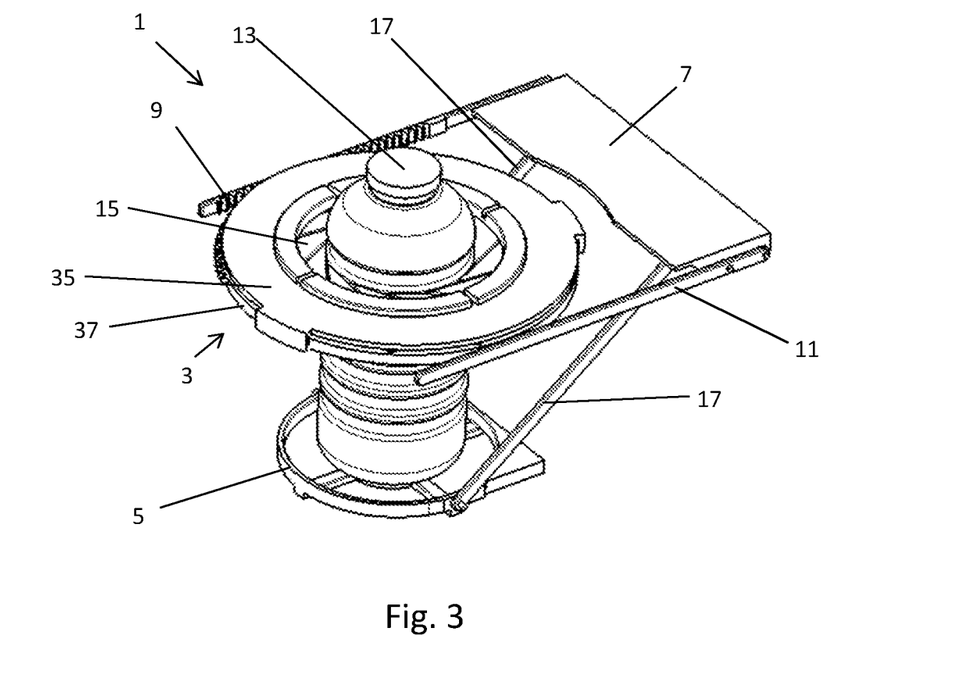
FIG. 3 is a perspective view of the drinking receptacle holder as shown in FIG. 2, wherein the drinking receptacle holder is shown holding a bottle.

Arranged as such, the holder 1 is configured to receive a drinking receptacle, such as a bottle 13 or cup, within the aperture 31, from the second side of the holding portion 3, and the base portion 5 is configured so that the drinking receptacle rests upon the base portion 5 when in use, as can be seen from FIG. 3 which shows the holder 1, without the housing 19 in place, holding a bottle 13. As will be described in more detail below, the diameter of the aperture 31 is configured to reduce as the base portion 5 is moved away from the holding portion 3 under the weight of the drinking receptacle so that the aperture 31 shrinks to fit the diameter of the drinking receptacle, thereby gripping and holding the drinking receptacle within the holder 1, as shown in FIG. 3.

The holding portion 3, which is fixed within the housing 19 as shown in FIG. 1, is connected to the movable body 7 via the rack arm 9 and the runner arm 11, which are connected to the holding portion 3 on opposing sides of the circumference of the holding portion 3. The holding portion 3 is movably mounted upon the rack arm 9 and the runner arm 11, so that the movable body 7 can be moved towards or away from the holding portion 3 by translating the holding portion 3 along the rack arm 9 and the runner arm 11, in the plane of the holding portion 3. The aperture 31 of the holding portion 3 is defined by twelve vanes 15 which are configured to deploy into or out of a channel 33 passing through the holding portion 3 as the movable body 7 is moved towards or away from the holding portion 3.

The twelve vanes 15 are sandwiched between an annular guide plate 35 and an annular cam plate 37 which together form the holding portion 3. The vanes 15 are circumferentially arranged between the guide plate 35 and the cam plate 37 and are configured to move into and out of the channel 33 in the holding portion 3 that is defined by the holes at the centre of the annular guide and cam plates 35, 37. The aperture 31 is defined by the vanes 15, which are configured to open and close the aperture 31 in similar manner to a camera shutter and thereby adjust the diameter of the aperture 31.

Figure 4:
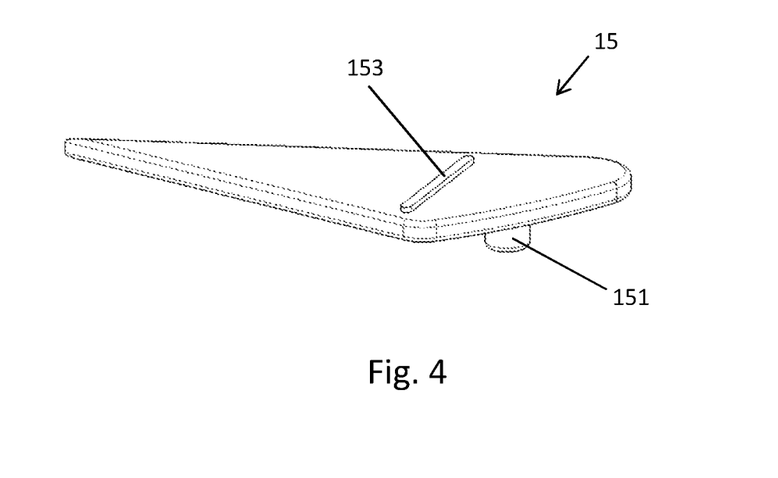
FIG. 4 is a perspective view of a vane of the holding portion of the drinking receptacle holder.
Figure 5:
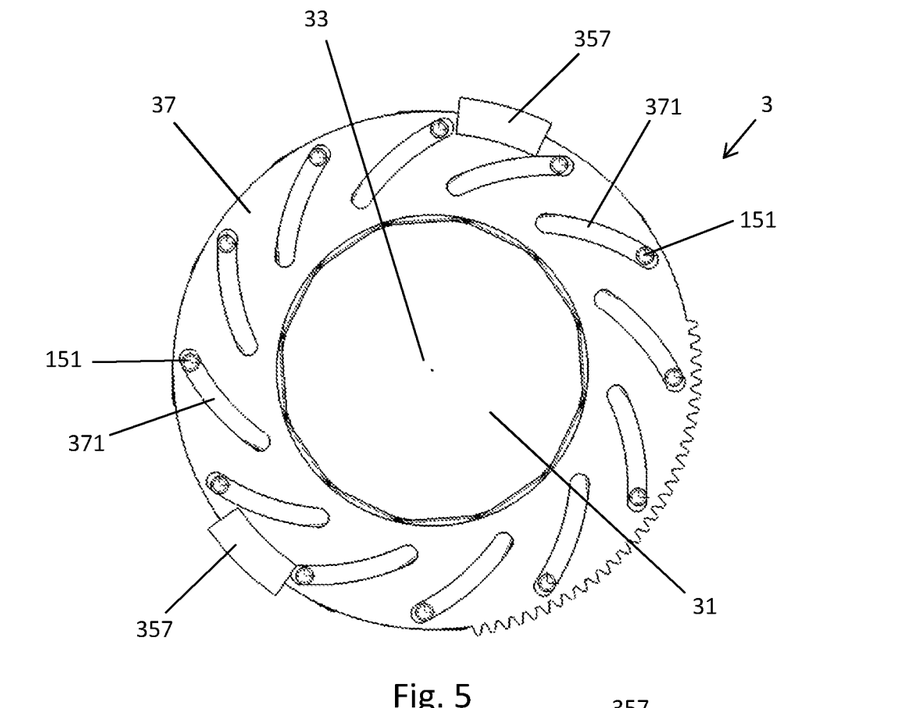
FIG. 5 is an underside view of the holding portion of the drinking receptacle holder.
Figure 6:
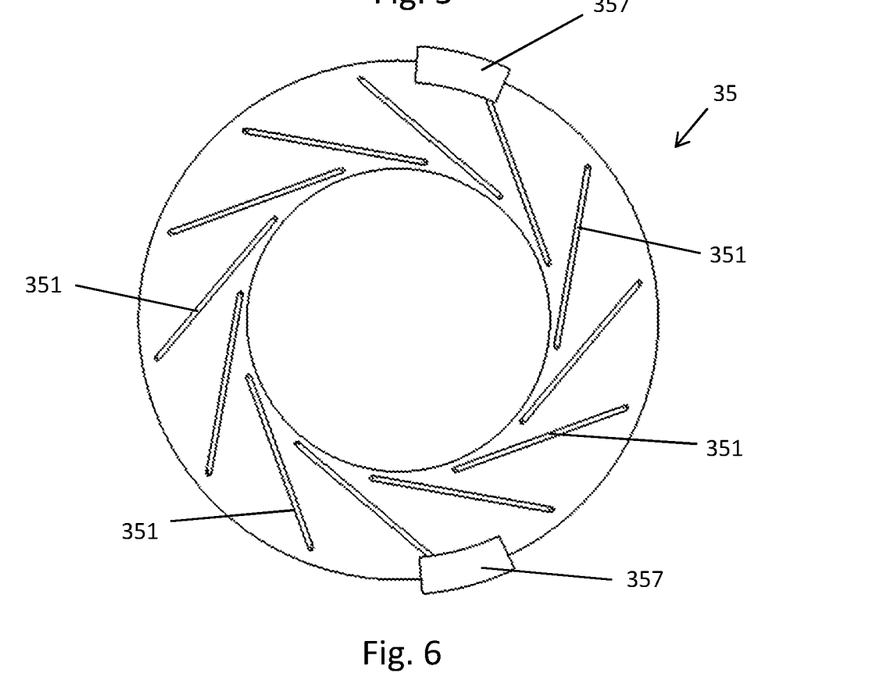
FIG. 6 is an underside view of the guide plate of the drinking receptacle holder.

A vane 15 is shown in isolation in FIG. 4, the vane 15 comprises substantially triangular plate with a cam-pin 151 projecting from a first side of the vane 15 and a linear elongate vane guide 153 projecting along a second, opposite side of the vane 15. As can be seen in FIG. 5, which is an underside view of the holding portion 3, the cam plate 37 comprises twelve cam slots 371 which are circumferentially spaced around the cam plate 37, each cam slot 371 being configured to receive a cam pin 151. The underside of the guide plate 35 (i.e. the side that faces the vanes 15) is shown in FIG. 6, as can be seen twelve guide slots 351 are located in the underside surface of the guide plate 35 and are circumferentially spaced around the guide plate 35, each guide slot 351 being configured to receive a vane guide 153. The guide slots 351 are longer than the vane guides 153 so that the vane guides 153 are slidable within the guide slots 351. Each vane 15 is therefore positioned within the holding portion 3 such that, on a first side of the vane 15, its cam pin 15 is located in a cam slot 371 on the cam plate 37, and such that, on a second, opposite side of the vane 15, its vane guide 153 is located in a guide slot 351 on the guide plate 35. As can be seen from FIG. 5, each cam slot 371 runs from the outer circumference of the cam plate 37 towards the channel 33 at the centre of the holding portion 3. Similarly, each guide slot 351 runs from the outer circumference of the guide plate 35 towards the channel 33 at the centre of the holding portion 3.

The guide plate 35, vanes 15, and cam plate 37 are held together by a pair of retaining members 357 that are formed on opposing sides of the guide plate 35 and project away from the underside of the guide plate 35. The retaining members 357 are configured to reach around to the cam plate 37 and abut the outer surface of the cam plate 37 (i.e. the surface not facing the vanes) so as to retain the cam plate 37 and vanes 15 in position with respect to the guide plate 35.

Figure 7:
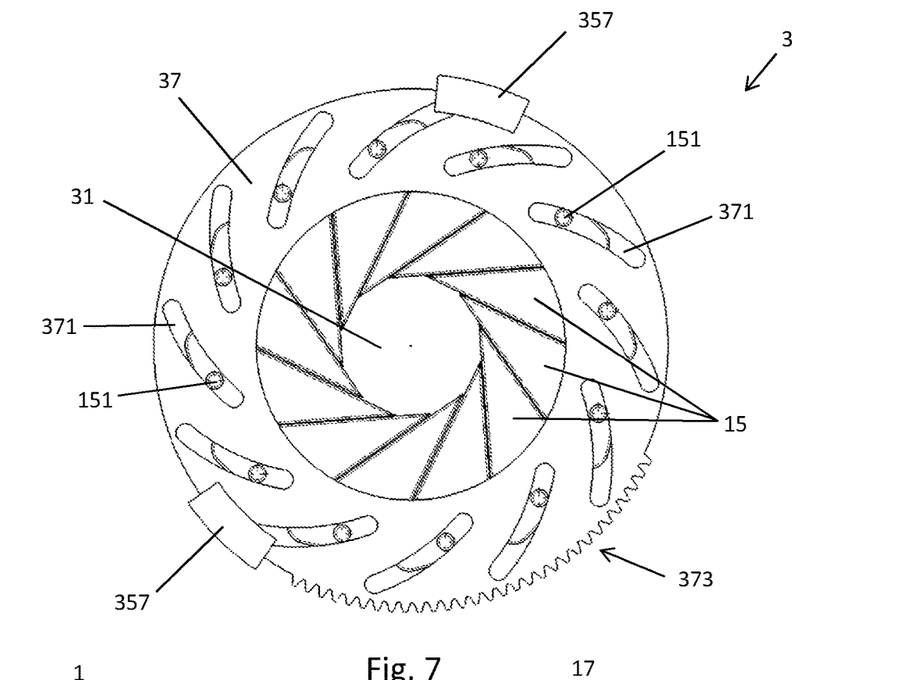
FIG. 7 is an underside view of the holding portion shown in FIG. 5 wherein the vanes of the holding portion have been moved to reduce the diameter of the aperture.

Movement of the vanes 15 into or out of the channel 33 defined by the holding portion 3 is effected by rotation of the cam plate 37 with respect to the guide plate 35, as will now be explained. The cam plate 37 is shown with the vanes 15 in a fully retracted position in FIG. 5, this position of the vanes 15 corresponds to the configuration of the holding portion 3 wherein the aperture 31 has the largest diameter, that being substantially equal to the diameter of the channel. From this position, the cam plate 37 can be rotated in a first direction (clockwise as shown in FIG. 4) such that the cam pins 151 abut the walls of the cam slots 371 to move the cam pins 151 along the cam slots 371 and into the channel 33 with rotation of the cam plate 37. Because of the linear shape of the guides 153 on each vane 15 and their respective guide slots 351, the vanes 15 are restricted to move linearly into to or out of the channel 33 under the action of the cam plate 37, and are not able to rotate. Configured as such, the vanes 15 move linearly into the channel 33 to reduce the diameter of the aperture 31 as the cam plate 37 rotates with respect to the guide plate 35, as can be seen in FIG. 7 wherein the cam plate 37 has been rotated with respect to the guide plates approximately 35 degrees clockwise from the position shown in FIG. 5.

As mentioned, the diameter of the aperture 31 is configured to reduce as the base portion 5 is moved away from the holding portion 3 under the weight of the drinking receptacle. The base portion 5 is connected to the movable body 7 via a pair of rotating arms 17, the arms 17 being rotatably connected to the base portion 5 and rotatably connected to the movable body 7. The arms 17 are connected to the base portion 5 on opposing sides of the base portion 5 and are biased towards the position shown in FIG. 2, in which the rotating arms 17 sit parallel with and alongside the rack arm 9 and the runner arm 11, by torsion springs 71 located in the movable body 7. When the receptacle holder is not in use, i.e. when it is not holding a drinking receptacle, as shown in FIG. 1, FIG. 2, and FIG. 8, therefore, the base portion 5 is biased to a position in which it is adjacent the aperture 31 on the underside of the holding portion 3, so that if a drinking receptacle is placed into the aperture 31 from the opposite side of the holding portion 3, the drinking receptacle comes into contact with the base portion 5 of the receptacle holder 1 and the weight of the receptacle pushes against the resilient bias of the torsion springs 71 to move the base portion 5 vertically downwards, away from the holding portion 3.

Figure 8:
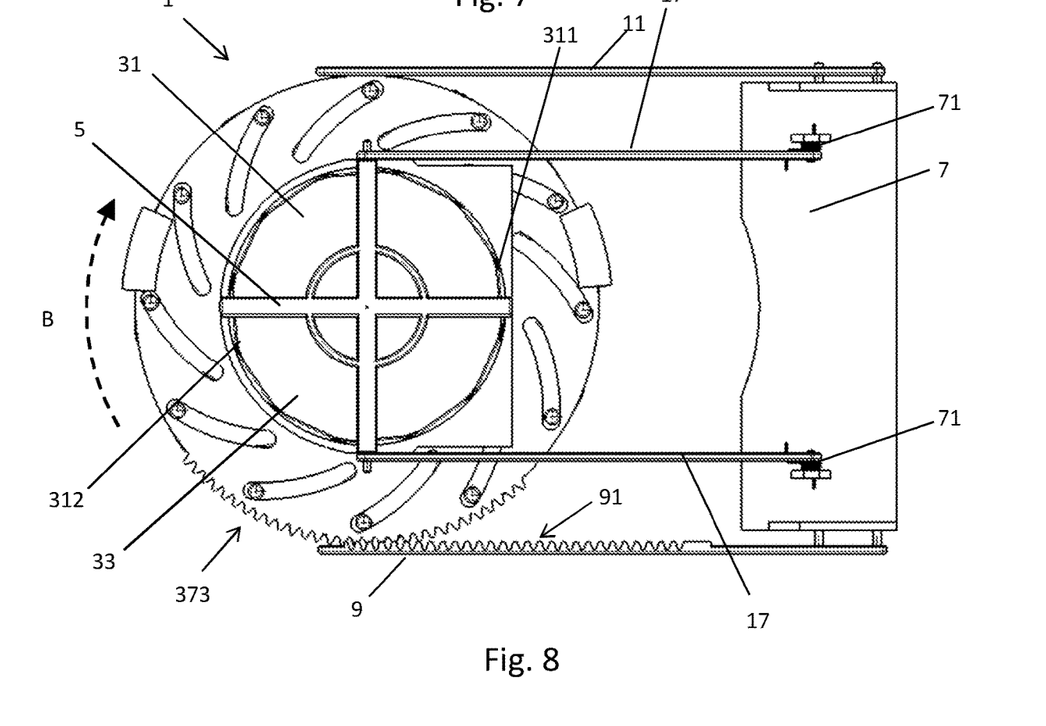
FIG. 8 is an underside view of the drinking receptacle holder.
Figure 9:
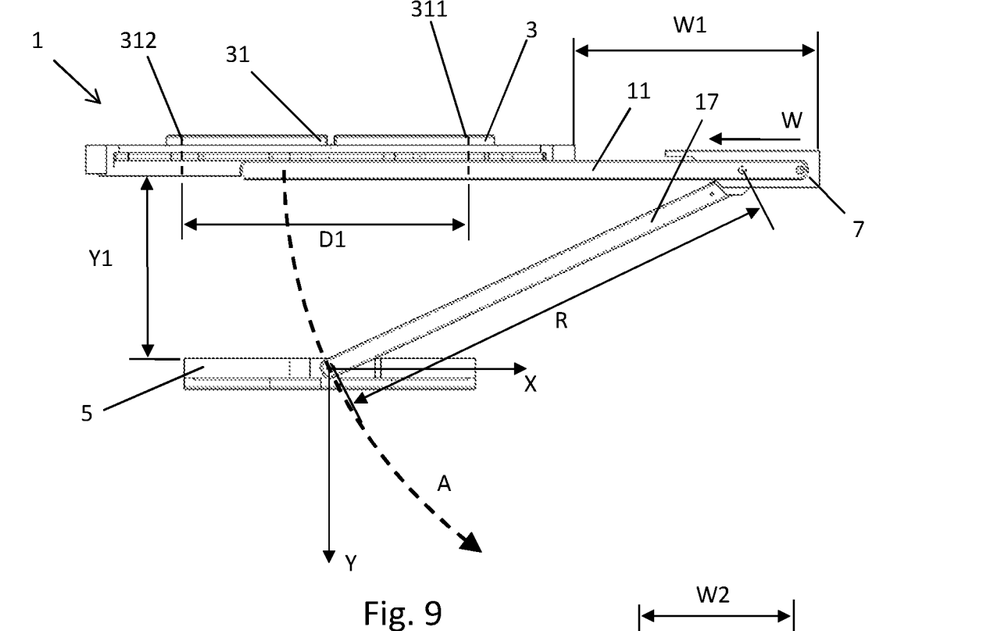
FIG. 9 is a side view of the drinking receptacle holder wherein the base portion is shown in a position in which it has been moved to a distance Y1 vertically downwards, away from the holding portion.
Figure 10:
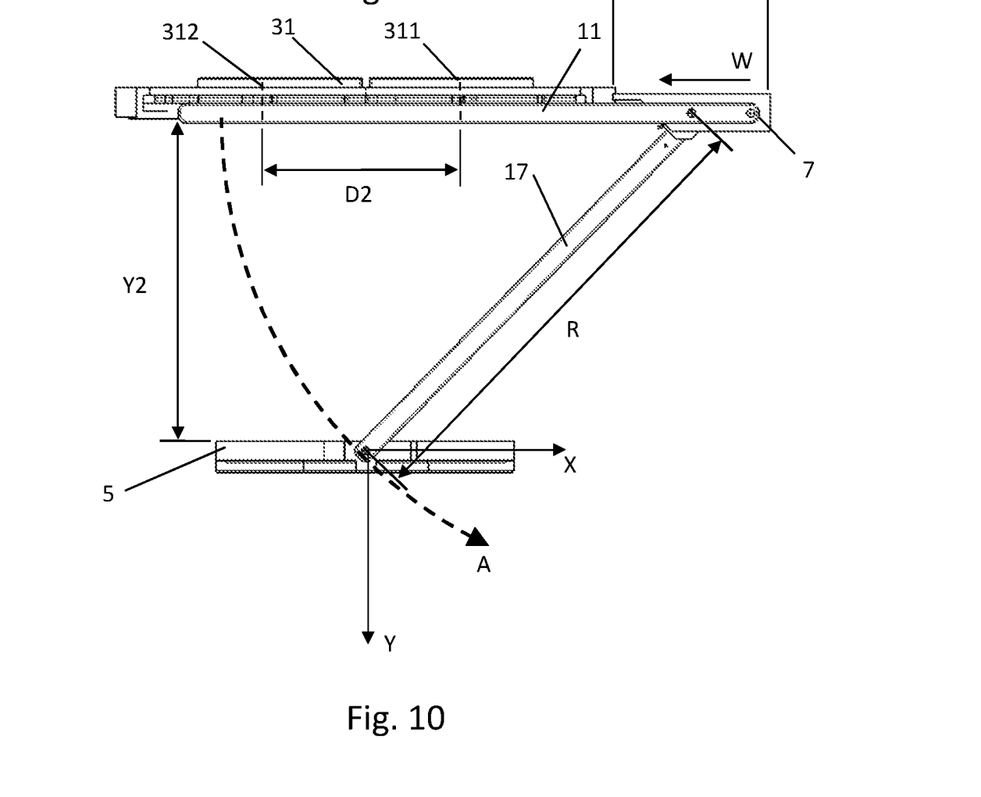
FIG. 10 is a side view of the drinking receptacle holder wherein the base portion is shown in a position in which it has been moved to a distance Y2 vertically downwards, away from the holding portion wherein the distance Y2 is greater than the distance Y1.

Because the base portion 5 is attached to the movable body 7 via rotating arms 17, as the base portion 5 is moved away from the holding portion 3 the movement of the base portion 5 with respect to the moveable body 7 traces the circumference of a circle having a radius R defined by the length of the rotating arms 17 as indicated by the arrow A in FIG. 9 and FIG. 10. The base portion 5 therefore moves vertically downwards, away from the holding portion 3 as indicated by the arrow Y in FIG. 8, whilst moving horizontally towards the movable body 7 as indicated by the arrow labelled X in FIG. 8. The drinking receptacle holder 1 uses the horizontal movement of the base portion 5 towards the movable body 7, in the direction of the arrow X, to reduce the diameter of the aperture 31 via a rack and pinion arrangement.

As can be seen in FIG. 8, a multiplicity of teeth 373 are formed on the outer circumference of the cam plate 37 and a multiplicity of teeth 91 are formed on the rack arm 9, the teeth 91 of the rack arm 9 interlock with the teeth 373 of the cam plate 37 so that the rack arm 9 forms the rack and the cam plate 37 forms the pinion. As the weight of a drinking receptacle pushes against the resilient bias of the torsion springs 71 to move the base portion 5 along the path of the arrow A with respect to the moveable body 7, the movement of the base 5 in the direction of the arrow labelled X moves the drinking receptacle into abutment with the inside edge 311 of the aperture 31 closest the movable body 7. Once the drinking receptacle abuts the inside edge 311 of the holding portion, the base portion 5 can no longer move horizontally with respect to the holding portion 3, therefore the moveable body 7 is pulled towards the holding portion 3, in the direction of the arrow labelled W (i.e. in a direction opposite to the arrow labelled X), as the base moves further along the path A with respect to the moveable body 7. Configured as such, the moveable body 7 is pulled closer towards the holding portion 3 as the drinking receptacle pushes the base portion 5 vertically downwards, further away from the holding portion 3 in the direction of the arrow labelled Y. The movement of the base portion 5 and moveable body 7 with respect to the holding portion 3 can be seen through a comparison of FIGS. 9 and 10. In FIG. 9 the base portion 5 has been moved by the drinking receptacle (not shown in FIG. 9 or 10) to at a vertical distance Y1 from the holding portion 3 and the moveable body 7 has moved to a horizontal distance W1 from the holding portion 3. In FIG. 10 the base portion 5 has been moved further away from the holding portion 3 by the drinking receptacle to a distance of Y2, which has caused the moveable body 7 to be pulled closer to the holding portion 3, as indicated by the distance W2. As can be seen, the diameter of the aperture 31 has reduced from a size D1 in FIG. 9 to a size D2 in FIG. 10 as the base portion 5 has moved further away from the holding portion 3.

Figure 11:
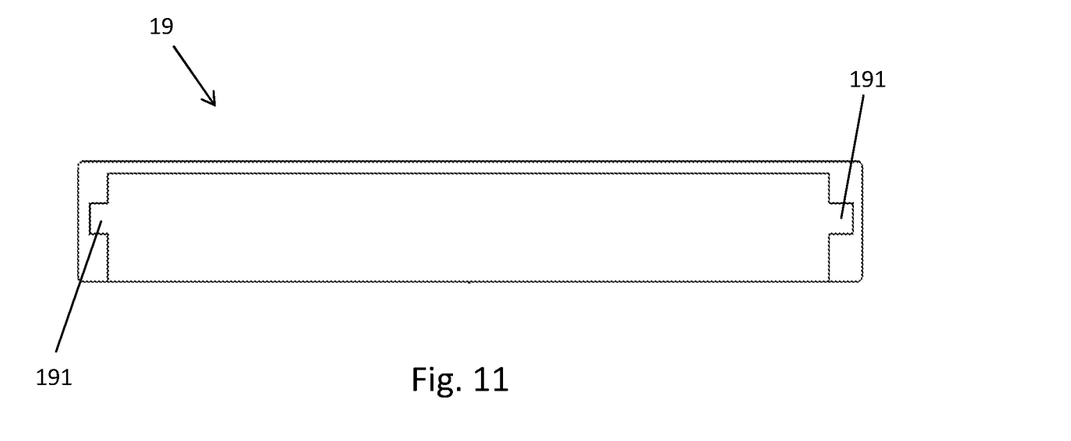
FIG. 11 is a cross-sectional view of the housing of the drinking receptacle holder.
Figure 12:
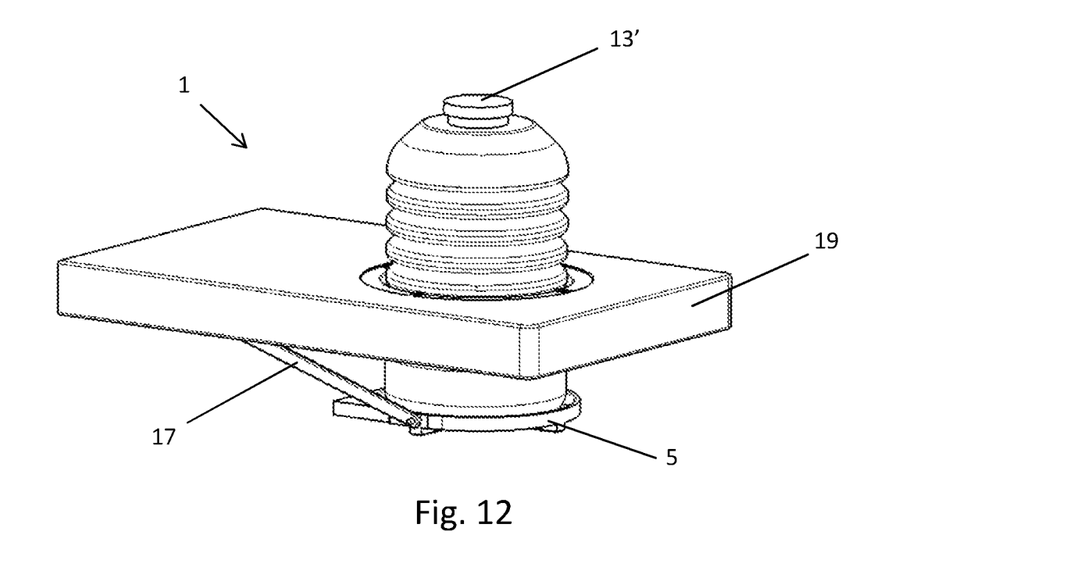
FIG. 12 is a perspective view of a drinking receptacle holder shown holding a bottle having a larger diameter than the bottle in FIG. 3.

As the moveable body 7 is moved towards the holding portion 3, the rack arm 19 and runner arm 11, which are located within grooves 191 within the housing 19 that can be seen in FIG. 11, slide within the grooves 191 towards the holding portion 3. As this happens, the rack arm 9 engages with the pinion formed by the teeth 373 on the cam plate forcing the cam plate 37 to rotate with respect to the guide plate 35 (clockwise as shown in FIG. 8, in the direction of the arrow labelled B), thereby moving the vanes 15 into the channel 33 and reducing the diameter of the aperture 31. The holding portion 3 is slidably mounted upon the runner arm 11, so the holding portion 3 slides along the runner arm 11 as the movable body 7 moves towards the holding portion 3. The drinking receptacle will continue to move vertically downwards into the aperture 31, and the moveable body 7 will continue to be pushed by the drinking receptacle horizontally towards the holding portion 3 until the vanes 15 have been deployed to a position in which the diameter of the aperture 31 is equal to the outer diameter of the bottle, as can be seen in FIG. 3. As such, the distance that the base portion 5 and moveable body 7 moves when receiving a drinking receptacle decreases with increasing drinking receptacle diameter, as can be seen by comparing FIG. 3, which shows the drinking receptacle holder 1 holding a bottle 13 having a first diameter, and FIG. 12 which shows the drinking receptacle holder 1 holding a bottle 13' having a second, larger diameter.

When a drinking receptacle is removed from the drinking receptacle holder 1, the base 5 is moved upwardly by the resilient bias of the torsion springs 71 in the opposite direction to the arrow labelled A, towards the receiving portion 3. The base 5 therefore moves away from the moveable body 7 (in the opposite direction to the arrow labelled X) and moves the drinking receptacle into abutment with the inside edge 312 of the aperture 31 furthest away from the movable body 7 (the inside edge 312 being located opposite the inside edge 311). Once the drinking receptacle abuts the inside edge 312 of the holding portion, the base portion 5 can no longer move horizontally with respect to the holding portion 3, therefore the moveable body 7 is pushed away from the holding portion 3 (in the direction opposite the arrow labelled W) as the base 5 moves closer towards the holding portion 3. As the moveable body 7 is pushed away from the holding portion 3, the rack arm 9 engages with the pinion formed by the teeth 373 on the cam plate forcing the cam plate 37 to rotate with respect to the guide plate 35 (anticlockwise as shown in FIG. 8, in the opposite direction to the arrow labelled B), thereby moving the vanes 15 out of the channel 33, increasing the diameter of the aperture 31. The drinking receptacle holder 1 therefore returns to its initial configuration, as shown in FIG. 1 and FIG. 2, when a drinking receptacle is removed from the holding portion 3.

Figure 13:
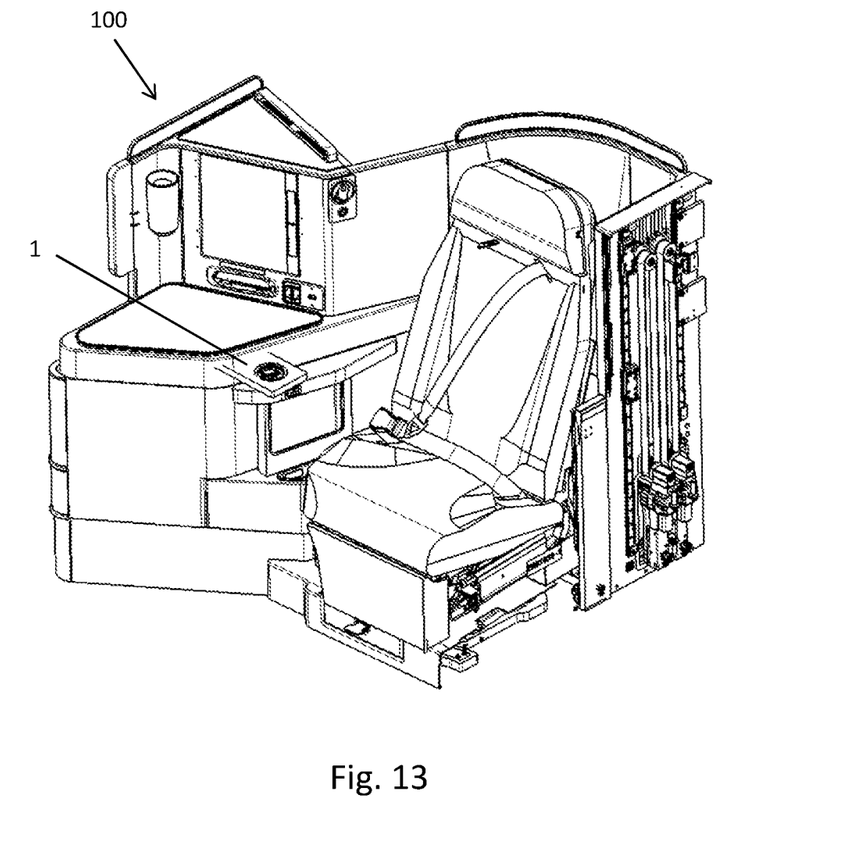
FIG. 13 shows an aircraft seat unit comprising a drinking receptacle holder according to an embodiment of the invention.

The housing 19 comprises mounting points (not shown) so that the drinking receptacle holder can be mounted to a variety of structures. For example, in FIG. 13 the drinking receptacle holder is shown mounted to an aircraft seat unit 100 so that a passenger of the aircraft seat unit 100 can use the drinking receptacle holder to store cups, bottles, or other items during flight.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

That which is claimed is:

1. A drinking receptacle holder comprising a holding portion and a base portion configured such that a drinking receptacle can be received within an aperture of the holding portion with the drinking receptacle resting upon the base portion,
    wherein the base portion is configured to be pushed away from the holding portion by the drinking receptacle as the drinking receptacle is moved through the aperture,
    wherein the holding portion comprises a cam plate defining a channel and one or more members configured to move into the channel as the base portion moves away from the holding portion, wherein the members define the aperture, and
    wherein, as the base portion is pushed away from the holding portion by the drinking receptacle, the cam plate is configured to abut against the members in order to move the members into the channel, thereby reducing the size of the aperture.

2. The drinking receptacle holder according to claim 1, wherein the base portion is configured to be pushed away from the holding portion under the weight of the drinking receptacle.

3. The drinking receptacle holder according to claim 1, wherein, when the base portion is pushed away from the holding portion by the drinking receptacle, the size of the aperture is configured to reduce until an inner edge of the aperture abuts against the drinking receptacle.

4. The drinking receptacle holder according to claim 3, wherein the members are receptacle gripping members that are configured to move into the channel to abut and grip the drinking receptacle.

5. The drinking receptacle holder according to claim 4, wherein the members are vanes that define the circumference of a substantially circular aperture.

6. The drinking receptacle holder according to claim 1, wherein the holding portion comprises a further plate and wherein, the cam plate is configured to abut against the members when the cam plate is rotated relative to the further plate.

7. The drinking receptacle holder according to claim 6, wherein the drinking receptacle holder further comprises a moveable body portion, and wherein the moveable body portion is moveably mounted in relation to the holding portion and the cam plate is configured to rotate relative to the further plate as the moveable body portion moves towards the holding portion, and
    wherein the moveable body portion is configured to move towards the holding portion as the base portion is pushed away from the holding portion by the drinking receptacle.

8. The drinking receptacle holder according to claim 7, wherein, as the base portion is pushed away from the holding portion by the drinking receptacle, the drinking receptacle is moved into abutment with the holding portion so that as the base portion is pushed away from the holding portion the moveable body portion is pulled towards the holding portion.

9. The drinking receptacle holder according to claim 8, wherein the base portion is pivotally mounted to the moveable body portion via an arm so that, as the base portion is pushed away from the holding portion by the drinking receptacle, the base portion moves away from the holding portion along a first axis and moves towards the moveable body portion along a second, perpendicular axis.

10. An aircraft seat unit comprising an aircraft seat and a drinking receptacle holder according to claim 1.

* * * * *

UNITED STATES PATENT AND TRADEMARK OFFICE
CERTIFICATE OF CORRECTION

PATENT NO. : 11,413,998 B2
APPLICATION NO. : 16/704139
DATED : August 16, 2022
INVENTOR(S) : Ciaran Doherty It is certified that error appears in the above-identified patent and that said Letters Patent is hereby corrected as shown below:

On the Title Page

Foreign Application Priority Data:
In (30) Line 1: Replace 1819866 with --1819866.3--.

Signed and Sealed this
Fourteenth Day of February, 2023

Katherine Kelly Vidal
*Director of the United States Patent and Trademark Office*